United States Patent
Stehman et al.

(10) Patent No.: US 6,935,173 B2
(45) Date of Patent: Aug. 30, 2005

(54) LIQUID LEVEL SENSING DEVICE

(75) Inventors: Nathan A. Stehman, Lancaster, PA (US); Andrew K. Snyder, Jr., Mohnton, PA (US); Shawn P. Doyle, New Philadelphia, PA (US)

(73) Assignee: Maxima Technologies & Systems, Inc., Lancaster, PA (US)

( * ) Notice: Subject to any disclaimer, the term of this patent is extended or adjusted under 35 U.S.C. 154(b) by 207 days.

(21) Appl. No.: 10/463,285

(22) Filed: Jun. 17, 2003

(65) Prior Publication Data

US 2003/0233875 A1 Dec. 25, 2003

Related U.S. Application Data

(60) Provisional application No. 60/391,865, filed on Jun. 25, 2002.

(51) Int. Cl.$^7$ .............................................. G01F 23/00
(52) U.S. Cl. ..................... 73/304 C; 73/290 R; 361/395
(58) Field of Search ........................... 73/304 C, 290 R; 361/395

(56) References Cited

U.S. PATENT DOCUMENTS

| | | | |
|---|---|---|---|
| 4,173,893 A | 11/1979 | Hedrick | 73/304 |
| 4,428,232 A * | 1/1984 | Tanaka et al. | 73/304 C |
| 4,864,857 A * | 9/1989 | Koon | 73/304 C |
| 4,920,798 A | 5/1990 | Weaver | 73/313 |
| 4,939,467 A * | 7/1990 | Nogami et al. | 324/663 |
| 5,146,785 A | 9/1992 | Riley | 73/313 |
| 5,156,047 A | 10/1992 | Tuma et al. | 73/304 |
| 5,406,843 A * | 4/1995 | Hannan et al. | 73/304 C |
| 5,477,727 A | 12/1995 | Koga | 73/304 |
| D378,284 S | 3/1997 | Grilk et al. | D10/101 |
| D397,631 S | 9/1998 | Riegel | D10/101 |
| 5,838,241 A * | 11/1998 | Lease et al. | 340/618 |
| 5,907,273 A | 5/1999 | Ross, Jr. et al. | 338/176 |
| 5,945,831 A | 8/1999 | Sargent et al. | 324/686 |
| 6,125,696 A | 10/2000 | Hannan et al. | 73/304 |
| 6,250,152 B1 | 6/2001 | Klein et al. | 73/304 |
| 6,269,695 B1 | 8/2001 | Cesternino et al. | 73/313 |
| 6,318,172 B1 | 11/2001 | Byatt et al. | 73/304 |
| 6,443,006 B1 * | 9/2002 | Degrave | 73/304 C |

* cited by examiner

Primary Examiner—Hezron Williams
Assistant Examiner—Rodney Frank
(74) Attorney, Agent, or Firm—Barley Snyder (57) ABSTRACT

A liquid level sensor includes a housing with circuitry provided therein. An inner and outer tube extend from the housing. The inner tube is positioned within a hollow center of the outer tube to form a coaxial configuration. A slot extends through the wall of the outer tube into the hollow center of the outer tube. The slot extends essentially the entire length of the outer tube. The circuitry, outer tube, and inner tube form a capacitive circuit to measure liquid. The slot allows the liquid to flow more easily into the hollow center of the outer tube and between the inner tube and outer tube to allow the sensor to provide accurate measurements with many types of fluids. The circuitry generates a pulse width modular output which is sent to a gauge to provide a visual representation of the level of the fluid in the container. By providing the pulse width modular output signal to the gauge, the sensor of the present invention can operate as a two-wire system, thereby mimicking a passive signal wire system, allowing the sensor to be a drop-in replacement for most prior art sensors.

15 Claims, 6 Drawing Sheets

LIQUID LEVEL SENSING DEVICE

This application claims the benefit of U.S. Provisional Application No. 60/391,865 filed Jun. 25, 2002.

FIELD OF THE INVENTION

The invention relates to a liquid level sensor and, in particular, a sensing device which accurately measures the level of the liquid in containers of varying geometry.

BACKGROUND OF THE INVENTION

Liquid level sensors are used in a variety of applications to sense fluid levels in reservoirs where it is important or desirable to periodically or continuously measure the level of fluid within the reservoir.

Prior art sensors include conventional fuel sensors which include a float carried on the end of a long pivoting arm suspended within the interior of the fuel supply tank. As the arm pivots, a short wiper blade having a ball contact slideably engages wires on a wound wire rheostat that varies in resistance in accordance with the position of the float and hence liquid level. The angular position of the pivoting float arm, or mote particularly the incremental angle of the arm, is not directly proportional to the vertical incremental change in float position and hence not directly proportional to liquid levels. An improvement in this type of mechanism is disclosed in U.S. Pat. No. 4,920,798 issued to Weaver. This reference teaches a fuel level sender which has a vertically reciprocal foam float that carries a slideable dual dwell contact member biased by springs in the float toward a fixed film resister plate.

Another form of liquid level sensor employs a capacitive probe having a pair of continuous elongated elements positioned on a substrate of the probe. This form of sensing system makes use of the difference in the dielectric of air from various liquids. In such systems, some means is provided for generating a signal which is applied to one plate of the probe. The overall capacitance of the capacitor formed by the two plates, and thus the magnitude of the signaled coupled onto the other one of the plates on the probe, will change as the percentage of the probe submerged in a fluid changes. Thus, the magnitude of the signal coupled onto the output plate of the probe can provide a relative indication of the area of the probe which is submerged in fluid and/or exposed in air. An example of this type of sensor is shown in U.S. Pat. No. 5,477,727 issued to Koga.

While the prior art devices have proven effective in certain applications, various problems exist with each style of sensor. The more mechanical-type sensors have proven less reliable and difficult to use when the space required for the sensor must be minimized. Therefore, in many applications, the use of the mechanical device is not an option. In contrast, the capacitive sensors require less space. Capacitive-type sensors rely on the difference of the dielectric constant of fluid and air. In order to measure this difference, the fluid flows between two capacitive plates. As the plates must be spaced proximate to each other, the flow of the fluid may be constricted if the fluid has debris or the like provided therein. In other words, the debris may lodge between the plates causing the flow of liquid to be restricted. Also, a false reading may occur due to the different dielectric constant of the foreign object. Another problem with the capacitive sensor also relates to the confined space between the plates. As different levels have different viscosity, the speed by which the liquid will flow in confined spaces will vary significantly. If the sensor is to be used with less viscous fluid, the sensor may sense the level improperly as the liquid captured between the plates will move at a different speed than the remaining fluid in the tank or reservoir.

Electronic sensors generally require three-wire installation (power, ground, and signal). While this type of configuration is practical in new installations, it is difficult to use three-wire installation to replace mechanical-style sensors which use two wires. Therefore, the use of prior art electronic sensors is limited in many applications.

It would, therefore, be beneficial to provide an electronic sensor which can be used as a replacement for mechanical and electrical sensors. It would also be beneficial to provide a sensor which can be used with various liquids, without concern of the viscosity or relative purity of the liquid.

SUMMARY OF THE INVENTION

The invention is directed to a liquid level sensor which has a housing with circuitry provided therein. An inner and outer tube extend from the housing. The inner tube is positioned within a hollow center of the outer tube to form a coaxial configuration. A slot extends through the wall of the outer tube into the hollow center of the outer tube. The slot extends essentially the entire length of the outer tube. The circuitry, outer tube, and inner tube form a capacitive circuit to measure liquid. The slot allows the liquid to flow more easily into the hollow center of the outer tube and between the inner tube and outer tube to allow the sensor to provide accurate measurements with many types of fluids.

The slot provides an opening which allows the liquid or fluid between the tubes to cooperate more directly with the remaining fluid in the tank. Therefore, as the fluid is not "trapped" as with prior sensors, the viscosity of the fluid is more transparent. More accurate readings are thereby obtained. It is also less likely that foreign particles will be trapped between the tubes of the present invention. As the slot extends for the entire length of the tube, any particle which enters between the tubes is easily removed by the flow of the fluid through the slot. Consequently, the slot allows the sensor to be much more accurate and reliable over time.

The invention is also directed to the liquid level sensor in which the circuitry generates a pulse width modular output which is sent to a gauge to provide a visual representation of the level of the fluid in the container. By providing the pulse width modular output signal to the gauge, the sensor of the present invention can operate as a two-wire system, thereby mimicking a passive signal wire system, allowing the sensor to be a drop-in replacement for most prior art sensors.

The invention is also directed to the system for measuring liquid in a container. The system includes a sensor having a housing with circuitry provided therein. A first tube and a second tube extend from the housing and cooperate with the liquid. The circuitry, first tube and second tube form a capacitive circuit. A gauge is electronically connected to the sensor. The sensor provides the visual display of the level of the fuel for an operator to read. The gauge provides power to the sensor and the sensor sends pulse width modular outputs to the gauge to control the visual display. The advantages of the system are the same as those stated above with respect to the sensor.

DETAILED DESCRIPTION OF THE EMBODIMENT SHOWN

Figure 1:
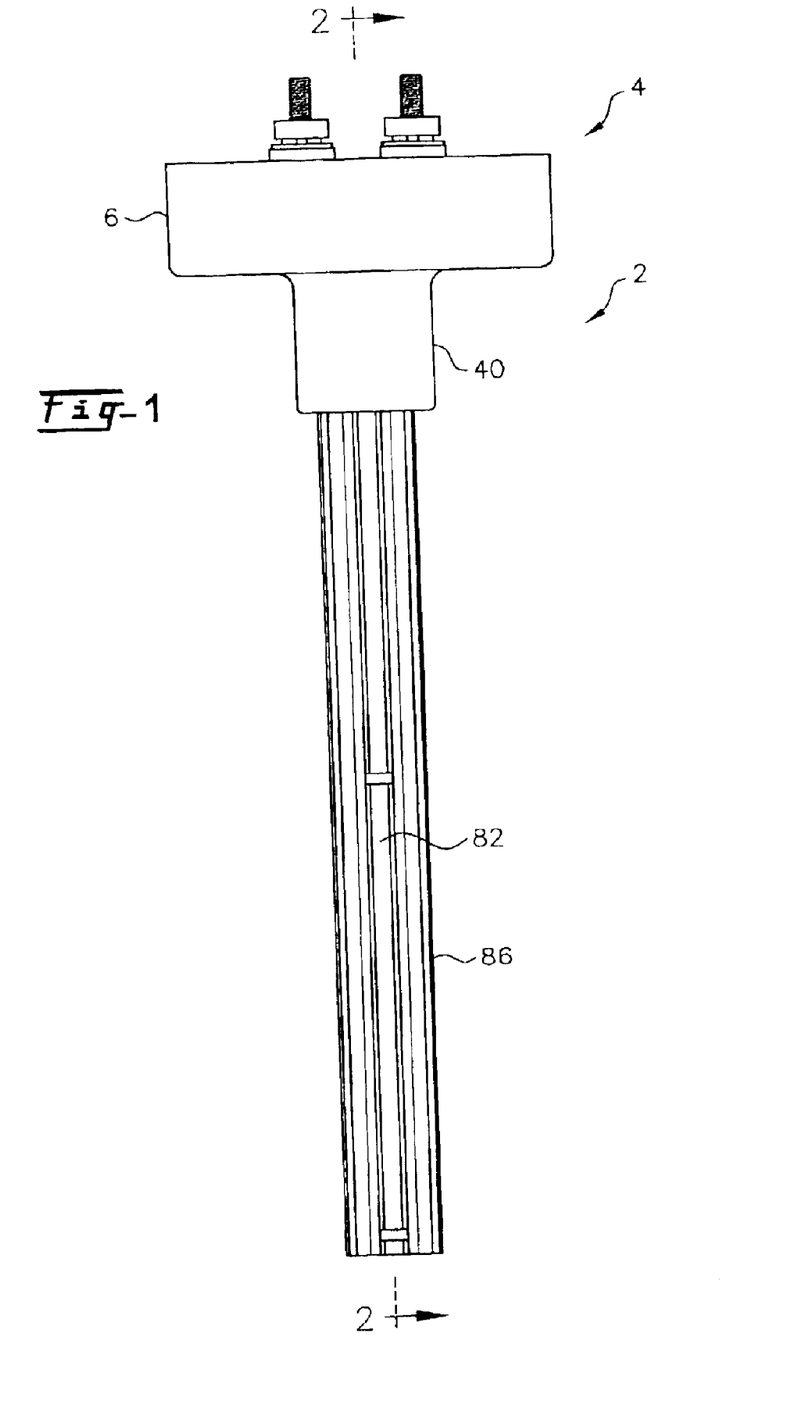
FIG. 1 is a perspective view of the liquid level sensor of the present invention.
Figure 2:
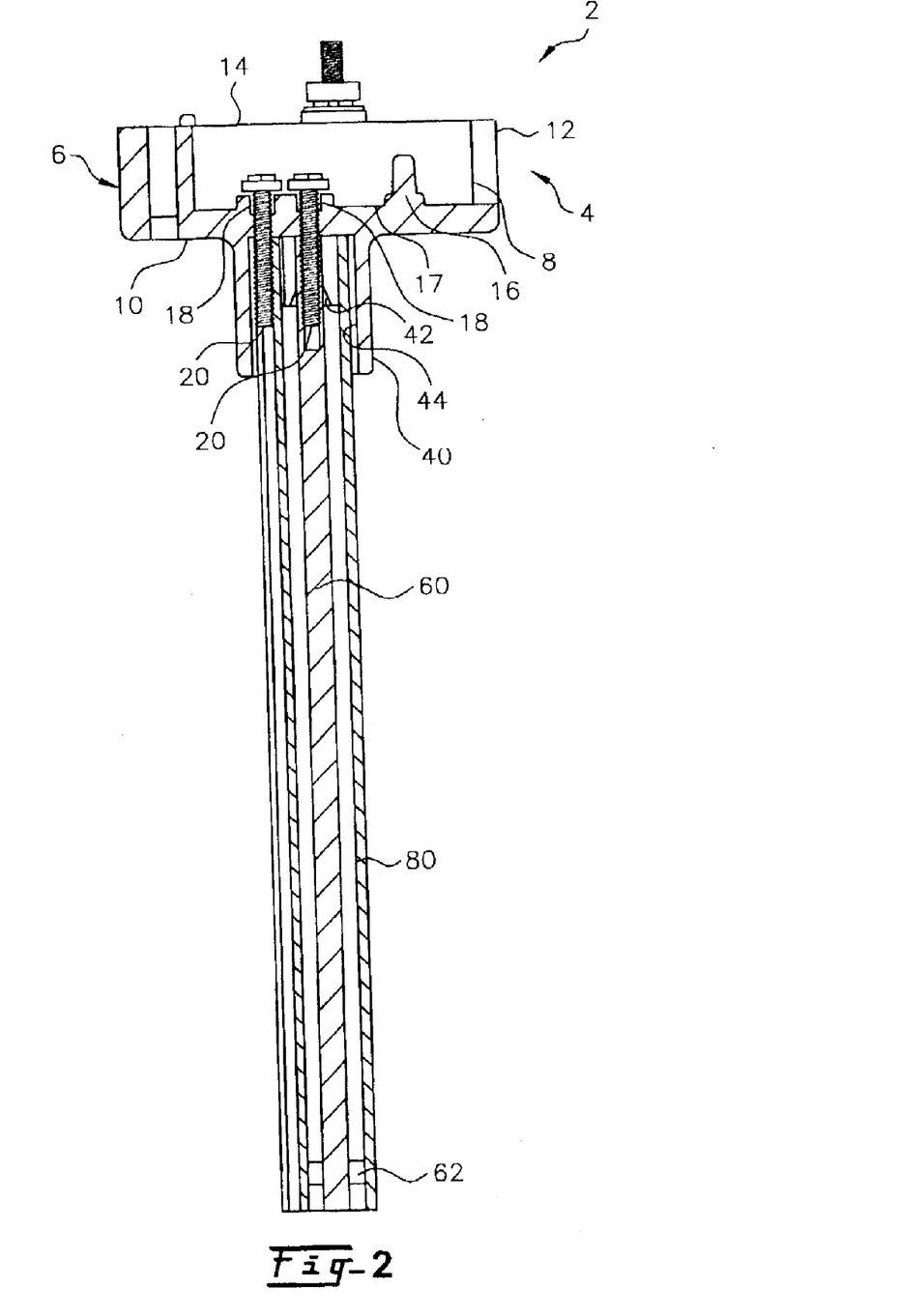
FIG. 2 is a cross-sectional view of the sensor taken along line 2—2 of FIG. 1.

Referring to FIG. 1, a liquid level sensor 2 is shown. The sensor 2 has a housing 4 which receives a printed circuit board 8 (FIG. 2) therein. In the embodiment shown, the housing 4 has a circular configuration when viewed from the top. However, other, configurations of the housing are possible without departing from the scope of the invention. Referring to FIG. 2, the housing 4 has a main portion 6 which houses the printed circuit board 8 therein. The main portion 6 has a bottom wall 10 and a circumferentially extending side wall 12. The bottom wall 10 and side wall 12 define a cavity 14 into which the circuit board is positioned. A circuit board locating member 16 projects from the bottom wall 10 into the cavity 14. The locating member 16 is configured to cooperate with an opening in the printed circuit board 8. The cooperation between the locating member 16 and the opening of the printed circuit board 8 insures that the board 8 will be accurately positioned in the cavity 14. The positioning of the opening and locating member also functions as a keying mechanism, insuring that the circuit board 8 is properly oriented within the cavity 14. A board mounting surface 17 is provided on the bottom wall 10. The surface 17 provides a supporting surface for the board 8 when the board is fully inserted into the cavity 14.

As best shown in FIG. 2, screw-receiving openings 18 extend from cavity 14 through bottom wall 10. With the circuit board 8 properly positioned in the cavity 14, corresponding screw-receiving openings of the circuit board 8 align with the openings 18. Circuit pads are provided on the board 8 proximate the openings. Screws 20 are inserted into the openings from the cavity 14. The screws are threadingly received in openings 18, thereby retaining the board 8 in position in the cavity 14. The screws 20 are configured such that the heads of the screws are positioned in electrical engagement with the pads of the board 8 when the screws 20 are fully inserted. The length of the screw is slightly longer than the thickness of the bottom wall 10 and board mounting surface. This allows the ends of the screws 20 to project beyond the bottom wall 10 of the main portion 6.

Once the board 8 is properly positioned in the cavity 14 and secured by screws 20, the cavity 14 is filled with a potting material. The potting material flows about the printed circuit board 8 and fills the cavity 14. The potting material seals the cavity 14 and the board 8 therein, thereby preventing damage to the board 8 or electrical connections in harsh environments (i.e. the potting material and housing prevents the liquid from reaching the board 8). The potting material adheres or bonds to the bottom wall 10 and side wall 12 to provide structural support to the housing 4. Potting material which provides the sealing and strength characteristics are known in the industry. Alternatively, it is possible to provide a sealing gel or the like in the cavity. If this type of option is utilized, a separate molded cover would be used to cover the cavity and maintain the gel in place. The cover could be secured to the housing 4 by any number of traditional securing means.

Tube securing member 40 extends from the main portion 6 in a direction opposite side wall 12. The tube securing member 40 has a first tube securing cavity 42 which is aligned along the longitudinal axis of the tube securing member 40 and is dimensioned to receive a first tube 60 therein. A second tube securing slot 44 is provided in the member 40. The second tube securing slot 44 is spaced from the cavity 42 to form a coaxial-type relationship. The slot 44 has a circular shape when viewed from the bottom and is dimensioned to receive a second tube 80 therein. Both the cavity 42 and slot 44 are dimensioned to provide an interference fit with the respective tubes 60, 80 when they are inserted therein. Alternatively, the tubes 60, 80 may be retained in member 40 by other conventional means, including overmolding the member 40 onto tubes 60, 80.

First tube 60 extends from the tube securing member 40 as shown in FIG. 2. The length of the first tube 60 will vary depending upon the application. When viewed in FIG. 3, the first tube 60 has a generally triangular configuration. The center of the tube 60 is hollow. Spaces 62 are provided periodically about the circumference of the tube 60.

Figure 3:
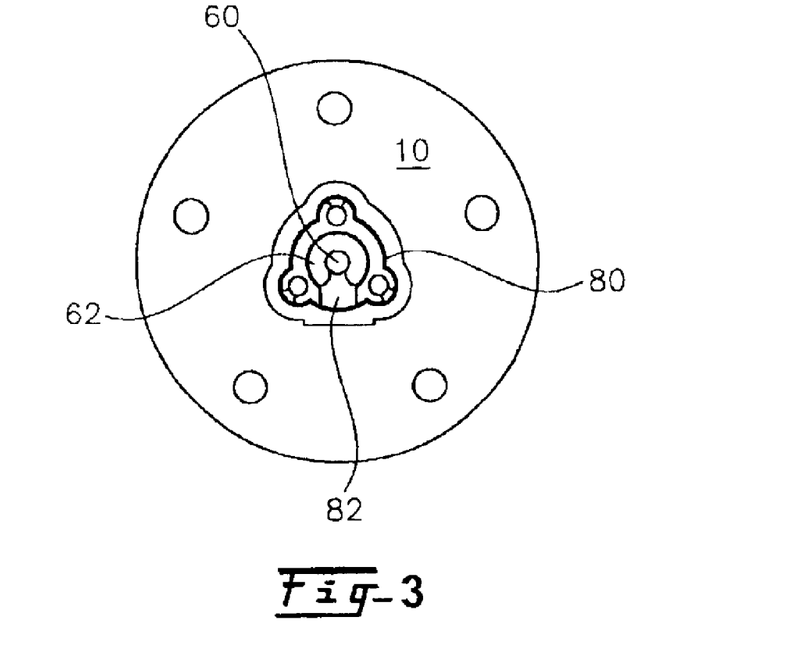
FIG. 3 is a bottom view taken of the sensor, showing the configuration of the tubes.

Second tube 80 extends from the tube securing member 40 in the same direction as first tube 60. The length of the second tube 80 will also vary according to the application. However, the length of the first tube 60 and second tube 80 will be approximately the same for respective applications. As viewed in FIG. 3, the second tube 80 has a generally circular cross-section. The center of tube 80 is hollow as indicated by 84 to allow the first tube 60 to be housed therein. Referring to FIGS. 1 and 3, a slot 82 is positioned in the tube 80 and extends the entire length thereof. The slot 82 extends through side wall 86 and provides an opening between the outside of the tube 80 and the hollow interior 84 thereof, thereby allowing liquid to flow easily, as will be more fully described.

Referring to FIGS. 2 and 3, the second or outer tube 80 encompasses the first or inner tube 6 to form a coaxial arrangement. The spacing between the tubes is maintained by at least one spacer 62. The spacer 62 also cooperates with the outer tube 80 to provide rigidity and strength to the outer tube. The spacing and configuration of the tubes 60, 80 form a capacitive circuit. As capacitive circuits are well known in the industry, a detailed explanation of the operation of the circuit will not be provided.

Figure 6:
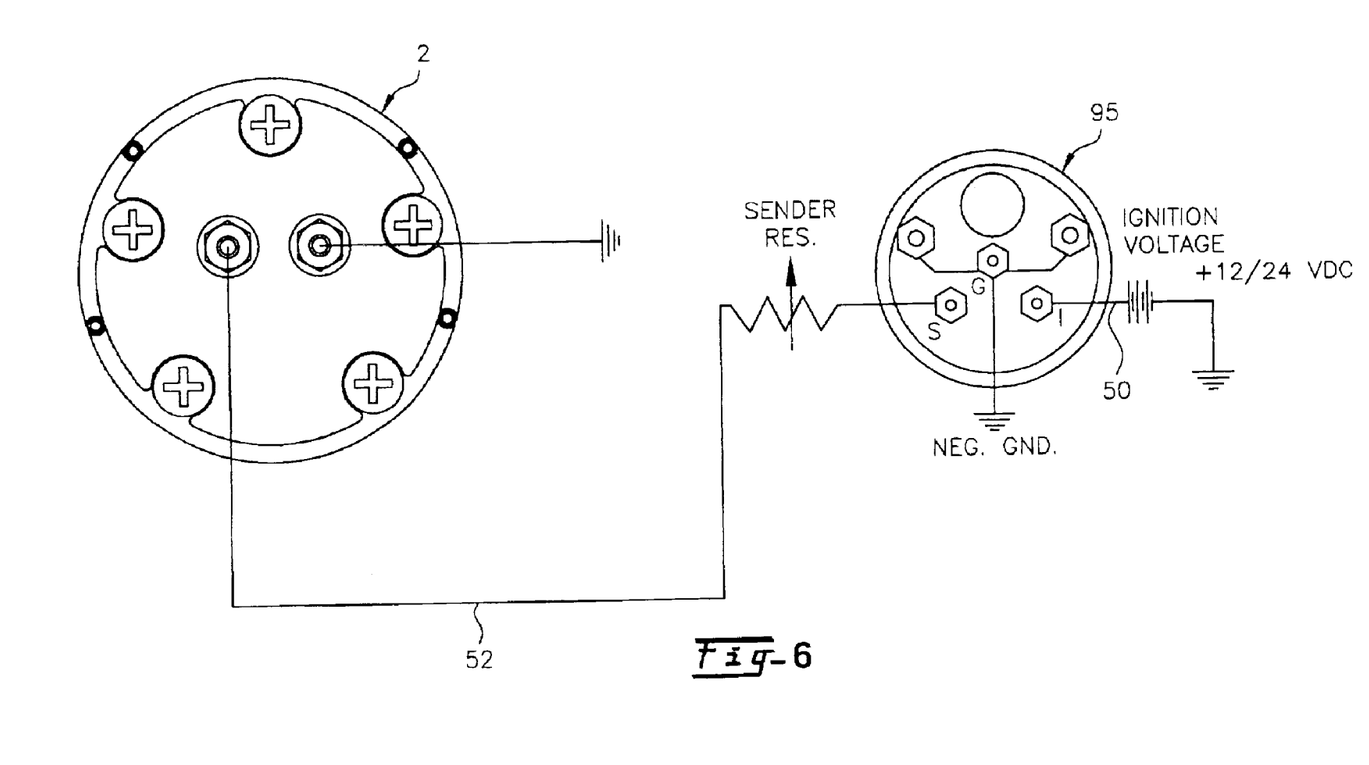
FIG. 6 is a block diagram representing the wiring of the sensor and gauge.

The tubes 60, 80 are in electrical contact with the screws 20 which are in electrical contact with the pads of the board 8. As shown in FIG. 6, the circuitry of the board includes a relaxation oscillator 84, controller 86, temperature compensation circuit 88, power supply 90, and pulse width modulated (PWM) output 92. Consequently, the capacitive circuit includes the tubes 60, 80 and circuitry on the board 8. The use of the circuitry allows for the sensor to calibrate itself. In many prior art sensors, the operator or installer had to mechanically adjust the gauge to the initial "zero" position, usually by means of a screw. In contrast, in the present invention the circuitry performs this function, thereby insuring the accuracy of the readings. In addition, due to the circuitry, the sensor can be programmed to measure reservoirs or containers of varying shape.

Figure 4:
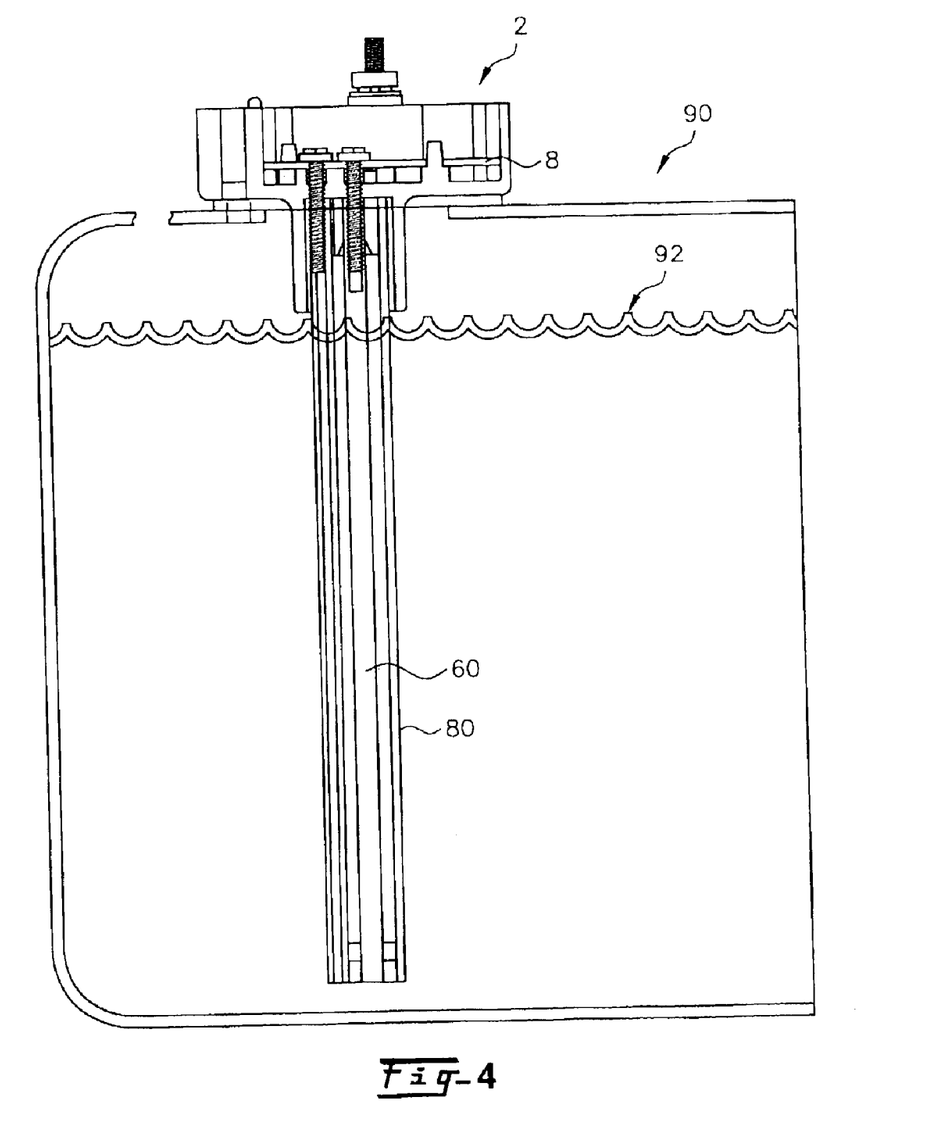
FIG. 4 is a diagrammatic, cross-sectional view of the sensor positioned in the reservoir with the fluid shown in a relatively full position.
Figure 5:
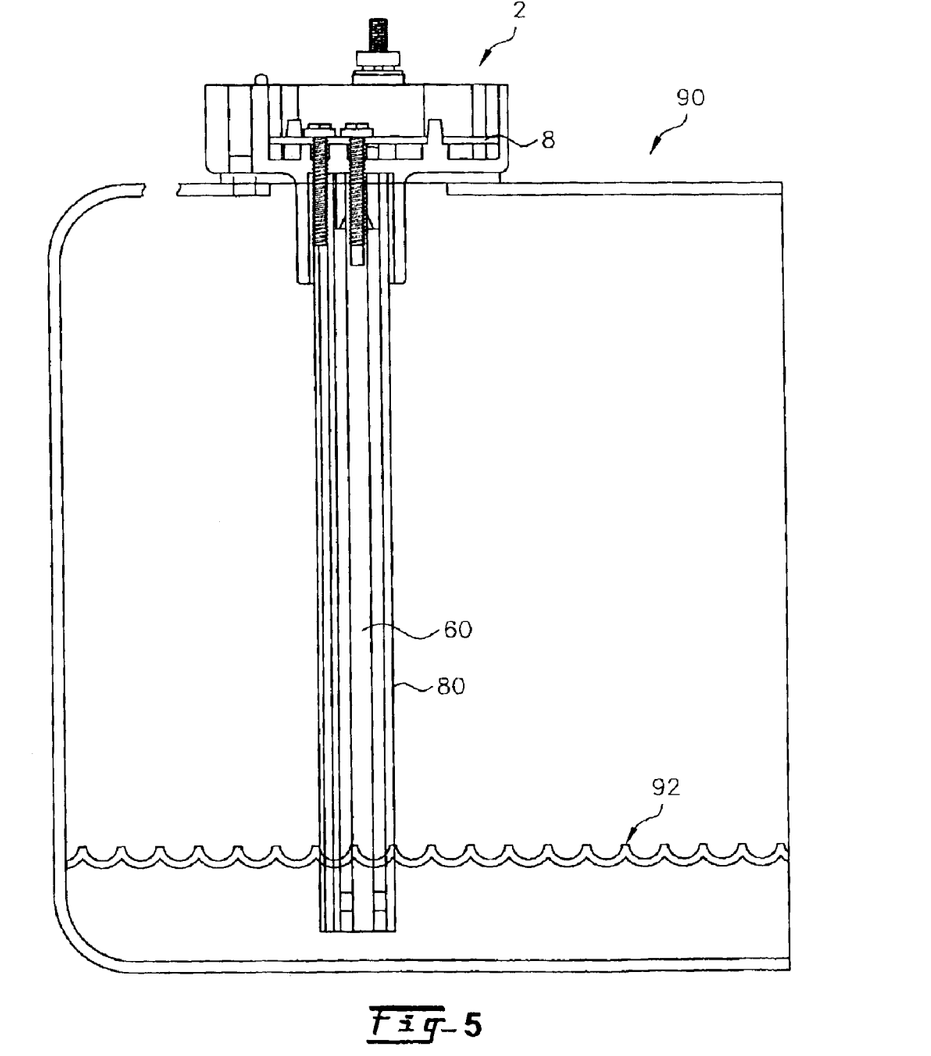
FIG. 5 is a diagrammatic, cross-sectional view of the sensor positioned in the reservoir, with the fluid shown in a relatively empty position.

Referring to FIGS. 4 and 5, use of the sensor 2 with a liquid will now be discussed. The sensor 2 is placed into a container or reservoir. As the sensor has no moving parts and as the tubes 60, 80 can be spaced closely to each other, the space occupied by the sensor can be minimized. This is particularly important in applications where space is at a premium, i.e. engine compartments of vehicles. The sensor 2 is secured in position using any type of conventional mounting means such as screws or the like. The particular mounting means used is dependent upon the type of reservoir, liquid, and environment.

FIG. 4 is a diagrammatic cross-sectional view representing the sensor 2 inserted into a reservoir 90 which has a relatively high or full liquid level 92. As shown, the liquid level trapped between tubes 60, 80 is representative of the level of liquid in the remainder of the reservoir. Therefore, as the dielectric constant of the liquid is different than that of air, the capacitive circuit can measure the rate at which it takes to charge/discharge respective tubes 60, 80. As this rate is directly dependent upon the level of the fluid at the dielectric constant thereof, the circuitry of the board 8 can convert the rate into a measurement of how full the reservoir is at any given point. It is important to note that the circuitry provided in the board 8 can compensate for many variables and allows the capacitive circuit to be used for different liquids (with a different dielectric constant) in reservoirs of varied shape and in environments where temperature changes occur.

As the liquid is removed from the tank or reservoir, the liquid provided between the tubes 60, 80 is lessened as shown in FIG. 5 and the rate of charge/discharge between the tubes is charged as the effective dielectric constant along the length of the tubes 60, 80 has changed. Therefore, as the rate changes, the circuitry recalculates the measurement of the tank and the operator's gauge changes accordingly.

The accuracy of the measurement sent to the gauge is directly dependent upon the accuracy of the fluid provided between the tubes 60, 80. In prior art sensors, the tube 80 is continuous about the circumference, i.e. no slot is provided. Consequently, when a viscous liquid is measured, the amount of liquid trapped between the tubes is not representative of the liquid remaining in the tank. As the fluid does not flow well in confined spaces, the movement of fluid trapped between the tubes significantly lags behind the movement of the remaining fluid in the tank, thereby causing can inaccurate reading. In addition, as many liquids have foreign particles suspended therein, there is a likelihood that the particles will become lodged between the tubes of the prior art sensors causing inaccurate readings and rendering the sensor essentially useless.

The present invention minimizes these problems. The slot 82 provides an opening which allows the fluid between the tubes 60, 80 to cooperate more directly with the remaining fluid in the tank. Therefore, as the fluid is not "trapped" as with prior sensors, the viscosity of the fluid is more transparent. More accurate readings are thereby obtained. It is also less likely that foreign particles will be trapped between the tubes of the present invention. As the slot 82 extends for the entire length of the tube 80, any particle which enters between the tubes 60, 80 is easily removed by the flow of the fluid through the slot 82. Consequently, the slot 82 allows the sensor 2 to be much more accurate and reliable over time.

Referring to FIG. 6, the circuitry of the board 8 and the output to the operator's gauge 95 is shown in block form. Conventionally, digital capacitive circuits are a three-wire system. A wire is required for power, ground, and signal. This type of system is not well suited for replacement of analog systems which require the use of only two wires. Consequently, if a sensor is to be replaced and the gauge requires a two-wire system, the prior art digital sensors cannot be utilized.

In contrast, the present invention is directed to a self-powered sensor, i.e. which draws sufficient power through the gauge 95. This allows the gauge 95 and the sensor 2 to operate as a two-wire system. As shown in FIG. 6, the sensor draws power through the gauge by means of wire 50. The sensor 2 operates in the manner described above and sends a pulse width modulated (PWM) signal back to the gauge via wire 52. This PWM signal drives the indicator on the gauge, providing the operator with the appropriate information in an easily readable format.

By providing the PWM signal to the gauge, the sensor 2 of the present invention can operate as a two-wire system, thereby mimicking a passive signal wire system, allowing the sensor 2 to be a drop-in replacement for most prior art sensors.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A liquid level sensor comprising:
a housing having circuitry provided on a printed circuit board positioned in the housing by locating members which cooperate with openings of the printed circuit board, wherein the printed circuit board is retained in the housing by screws which make electical engagement with the circuit board,
an inner tube extending from the housing, and
an outer tube extending from the housing, the inner tube being positioned within a hollow center of the outer tube to form a coaxial configuration, a slot provided in the outer tube, the slot extending through the wall of the outer tube into the hollow center of the outer tube, the slot extending essentially the entire length of the outer tube,
the circuitry, outer tube, and inner tube form a capacitive circuit to measure liquid,
whereby the slot allows the liquid to flow more easily into the hollow center of the outer tube and between the inner tube and outer tube to allow the sensor to provide accurate measurements with many types of fluids.

2. The liquid level sensor as recited in claim 1 wherein a potting material is provided in a cavity of the housing into which the printed circuit board is inserted, the potting material provides a seal to protect the printed circuit board from environmental harm.

3. The liquid level sensor as recited in claim 1 wherein the circuitry generates a pulse width modulated output which is sent to a gauge which provides a visual representation of the level of fluid.

4. The liquid level sensor as recited in claim 3 wherein the liquid level sensor is powered through the gauge, thereby eliminating the need for a separate power supply.

5. The liquid level sensor as recited in claim 1, wherein the screws are in electrical contact with pads on the printed circuit board and the inner tube and the outer tube are each in electrical contact with a respective one of the screws.

6. A liquid level sensor comprising:
a housing having circuitry provided therein,
an inner tube extending from the housing,
an outer tube extending from the housing, the inner tube being positioned within a hollow center of the outer tube to form a coaxial configuration, the circuitry, outer tube, and inner tube form a capacitive circuit to measure liquid in a container.

the circuitry generates a pulse width modulated output which is sent to a gauge to provide a visual representation of the level of the fluid in the container.

7. The liquid level sensor as recited in claim 6 wherein the liquid level sensor is powered through the gauge, thereby eliminating the need for a separate power supply.

8. The liquid level sensor as recited in claim 7 wherein the circuitry is provided on a printed circuit board.

9. The liquid level sensor as recited in claim 8 wherein the printed circuit board is positioned in the housing by locating members which cooperate with openings of the printed circuit board, and the printed circuit board is retained in the housing by screws which make electrical engagement with the circuit board.

10. The liquid level sensor as recited in claim 9 wherein a potting material is provided in a cavity of the housing into which the printed circuit board is inserted, the potting material provides a seal to protect the printed circuit board from environmental harm.

11. The liquid level sensor as recited in claim 9 wherein a slot is provided in the outer tube, the slot extending through the wall of the outer tube into the hollow center of the outer tube.

12. The liquid level sensor as recited in claim 11 wherein the slot extends essentially the entire length of the outer tube.

13. A system for measuring liquid in a container, the system comprising:

a sensor having a housing with circuitry provided therein, a first tube and a second tube extend from the housing and cooperate with the liquid, the circuitry, first tube and second tube forming a capacitive circuit, a gauge electronically connected to the sensor, the sensor providing the visual display of the level of the full for an operator to read, the gauge provides power to the sensor and the sensor sends pulse width modulated outputs to the gauge to control the visual display.

14. The liquid level sensor as recited in claim 13 wherein a slot is provided in the outer tube, the slot extending through the wall of the outer tube into the hollow center of the outer tube.

15. The liquid level sensor as recited in claim 13 wherein the slot extends essentially the entire length of the outer tube.

* * * * *